US008739230B2

(12) United States Patent
McEnroe et al.

(10) Patent No.: US 8,739,230 B2
(45) Date of Patent: May 27, 2014

(54) MANAGER/REMOTE CONTENT ARCHITECTURE

(75) Inventors: Elizabeth Rose McEnroe, Palo Alto, CA (US); Thomas H. Taylor, Redmond, WA (US); Mark Wagner, Seattle, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 966 days.

(21) Appl. No.: 11/275,656

(22) Filed: Jan. 20, 2006

(65) Prior Publication Data

US 2007/0174656 A1 Jul. 26, 2007

(51) Int. Cl.
*H04N 7/18* (2006.01)

(52) U.S. Cl.
USPC ................. 725/80; 725/74; 725/82; 709/208; 709/209; 709/210; 709/211

(58) Field of Classification Search
USPC .......................... 725/74, 80, 82; 709/208–211
See application file for complete search history.

(56) References Cited

U.S. PATENT DOCUMENTS

| 5,583,995 | A | 12/1996 | Gardner et al. |
| 5,854,887 | A | 12/1998 | Kindell et al. |
| 5,901,148 | A | 5/1999 | Bowen et al. |
| 5,940,738 | A | 8/1999 | Rao |
| 6,125,396 | A | 9/2000 | Lowe |
| 6,133,910 | A | 10/2000 | Stinebruner |
| 6,330,603 | B1 | 12/2001 | Seki et al. |
| 6,466,978 | B1 | 10/2002 | Mukherjee et al. |
| 6,510,556 | B1 | 1/2003 | Kusaba et al. |
| 6,538,656 | B1 | 3/2003 | Cheung et al. |
| 6,795,707 | B2 | 9/2004 | Martin et al. |
| 6,820,278 | B1 * | 11/2004 | Ellis ................................ 725/80 |
| 6,839,070 | B2 | 1/2005 | Meandzija et al. |
| 6,848,004 | B1 | 1/2005 | Chang et al. |
| 6,965,770 | B2 | 11/2005 | Walsh et al. |
| 6,973,038 | B1 * | 12/2005 | Narendran .................... 370/238 |
| 7,068,674 | B1 * | 6/2006 | Jang et al. .................... 370/432 |
| 7,257,132 | B1 | 8/2007 | Akamatsu et al. |
| 7,337,233 | B2 | 2/2008 | Dillon |
| 7,366,199 | B1 | 4/2008 | Vaughan et al. |

(Continued)

FOREIGN PATENT DOCUMENTS

| EP | 1355496 A2 | 10/2003 |
| JP | 10303932 A | 11/1998 |

(Continued)

OTHER PUBLICATIONS

The European Search Report mailed Sep. 6, 2011 for European Patent Application No. 06845234.1, 8 pages.

(Continued)

*Primary Examiner* — Yassin Alata
(74) *Attorney, Agent, or Firm* — Micah P. Goldsmith; Glen Johnson; Micky Minhas

(57) ABSTRACT

Embodiments of a manager/remote content architecture are described herein. The architecture, for instance, may provide management of content received from a content provider, such as to determine which client devices are authorized to output the content. Techniques are also described which allow one of the remote client devices to act as a "limited manager" to allocate content usage by the architecture when the manager client device is not available.

18 Claims, 6 Drawing Sheets

(56) References Cited

U.S. PATENT DOCUMENTS

| | | |
|---|---|---|
| 7,380,264 B2 | 5/2008 | Potrebic |
| 7,467,218 B2 | 12/2008 | Gould et al. |
| 7,617,272 B2 | 11/2009 | Bulson et al. |
| 7,634,652 B2 | 12/2009 | McEnroe et al. |
| 7,669,222 B2 | 2/2010 | McEnroe et al. |
| 7,685,306 B2 | 3/2010 | McEnroe et al. |
| 2001/0034649 A1 | 10/2001 | Acres |
| 2001/0049715 A1 | 12/2001 | Kidder |
| 2002/0083187 A1 | 6/2002 | Sim et al. |
| 2002/0087696 A1 | 7/2002 | Byrnes |
| 2002/0097750 A1 | 7/2002 | Gunaseelan et al. |
| 2002/0112247 A1 | 8/2002 | Horner et al. |
| 2002/0126698 A1 | 9/2002 | Deshpande |
| 2002/0133537 A1 | 9/2002 | Lau et al. |
| 2002/0133573 A1* | 9/2002 | Matsuda et al. ............ 709/220 |
| 2002/0133589 A1 | 9/2002 | Gubbi et al. |
| 2003/0009452 A1 | 1/2003 | O'Rourke et al. |
| 2003/0041164 A1 | 2/2003 | Denecheau et al. |
| 2003/0048801 A1 | 3/2003 | Sala et al. |
| 2003/0050058 A1 | 3/2003 | Walsh et al. |
| 2003/0069964 A1 | 4/2003 | Shteyn et al. |
| 2003/0072259 A1* | 4/2003 | Mor ............................ 370/223 |
| 2003/0086413 A1 | 5/2003 | Tartarelli et al. |
| 2003/0093548 A1 | 5/2003 | Cinghita et al. |
| 2003/0115294 A1 | 6/2003 | Hoang |
| 2003/0158890 A1 | 8/2003 | Miller et al. |
| 2003/0177179 A1 | 9/2003 | Jones et al. |
| 2003/0195977 A1 | 10/2003 | Liu et al. |
| 2003/0204848 A1 | 10/2003 | Cheng et al. |
| 2003/0204853 A1 | 10/2003 | Fries et al. |
| 2003/0233540 A1 | 12/2003 | Banerjee et al. |
| 2004/0039834 A1 | 2/2004 | Saunders et al. |
| 2004/0125779 A1 | 7/2004 | Kelton et al. |
| 2004/0163130 A1 | 8/2004 | Gray et al. |
| 2004/0187152 A1 | 9/2004 | Francis et al. |
| 2004/0255323 A1 | 12/2004 | Varadarajan et al. |
| 2005/0005300 A1 | 1/2005 | Putterman et al. |
| 2005/0041595 A1 | 2/2005 | Uzun et al. |
| 2005/0071876 A1 | 3/2005 | van Beek |
| 2005/0076127 A1* | 4/2005 | Wilson et al. ................ 709/227 |
| 2005/0102698 A1* | 5/2005 | Bumgardner et al. .......... 725/80 |
| 2005/0120102 A1 | 6/2005 | Gandhi et al. |
| 2005/0138621 A1 | 6/2005 | Clark et al. |
| 2005/0138663 A1* | 6/2005 | Throckmorton et al. ....... 725/80 |
| 2005/0138668 A1 | 6/2005 | Gray et al. |
| 2005/0172315 A1 | 8/2005 | Chen |
| 2005/0188415 A1 | 8/2005 | Riley |
| 2005/0198097 A1 | 9/2005 | Kalnitsky |
| 2005/0198662 A1 | 9/2005 | Endo et al. |
| 2005/0213503 A1 | 9/2005 | Guo et al. |
| 2005/0220117 A1* | 10/2005 | Omi et al. ................ 370/395.4 |
| 2005/0223232 A1 | 10/2005 | Anderson et al. |
| 2005/0251566 A1 | 11/2005 | Weel |
| 2005/0254788 A1* | 11/2005 | Yamagata et al. ............ 386/94 |
| 2005/0289618 A1* | 12/2005 | Hardin ............................ 725/95 |
| 2006/0010003 A1 | 1/2006 | Kruse |
| 2006/0020960 A1 | 1/2006 | Relan et al. |
| 2006/0031887 A1* | 2/2006 | Sparrell et al. .................. 725/78 |
| 2006/0053452 A1 | 3/2006 | Lee et al. |
| 2006/0064729 A1 | 3/2006 | Steading |
| 2006/0080453 A1 | 4/2006 | Thukral |
| 2006/0098618 A1 | 5/2006 | Bouffioux |
| 2006/0120385 A1 | 6/2006 | Atchison et al. |
| 2006/0126507 A1 | 6/2006 | Nakayasu |
| 2006/0171390 A1 | 8/2006 | La Joie |
| 2006/0179408 A1 | 8/2006 | Ko |
| 2006/0190589 A1 | 8/2006 | Parker |
| 2006/0195464 A1 | 8/2006 | Guo |
| 2006/0200412 A1 | 9/2006 | Fahrny et al. |
| 2006/0215558 A1 | 9/2006 | Chow |
| 2006/0235883 A1 | 10/2006 | Krebs |
| 2007/0039033 A1 | 2/2007 | Ota |
| 2007/0089057 A1 | 4/2007 | Kindig |
| 2007/0104146 A1* | 5/2007 | Hossain et al. ............... 370/331 |
| 2007/0162502 A1 | 7/2007 | Thomas et al. |
| 2007/0174883 A1 | 7/2007 | McEnroe et al. |
| 2007/0180112 A1 | 8/2007 | McEnroe et al. |
| 2007/0203714 A1 | 8/2007 | McEnroe et al. |
| 2007/0204313 A1 | 8/2007 | McEnroe et al. |
| 2008/0034391 A1 | 2/2008 | Lehman et al. |
| 2008/0133701 A1 | 6/2008 | Kazmi et al. |
| 2008/0301736 A1 | 12/2008 | Heilbron et al. |

FOREIGN PATENT DOCUMENTS

| | | |
|---|---|---|
| JP | 2003179663 A | 6/2003 |
| JP | 2004173197 A | 6/2004 |
| JP | 2005110267 A | 4/2005 |
| KR | 20050015528 A | 2/2005 |
| WO | WO0059230 A1 | 10/2000 |
| WO | WO2005107367 A2 | 11/2005 |
| WO | WO2005122025 A2 | 12/2005 |

OTHER PUBLICATIONS

The European Office Action mailed Feb. 4, 2013 for European patent application No. 06845234.1, a counterpart foreign application of US patent No. 7,669,222, 4 pages.

European Office Action mailed Feb. 12, 2014 for European patent application No. 06845234.1, a counterpart foreign application of U.S. Appl. No. 11/275,577, 14 pages.

* cited by examiner

MANAGER/REMOTE CONTENT ARCHITECTURE

BACKGROUND

Traditionally, in order to receive television programs, users were limited to broadcasts of the television programs that were received via antennas, from cable providers, and so on. For example, the user may have configured a traditional "over-the-air" antenna, connected a cable to a television set, and so on to receive broadcasts of television programs.

Today, however, users are consistently exposed to ever greater varieties and amounts of content. For example, users may now receive and interact with pay-per-view (PPV) content (e.g., movies and sporting events), video-on-demand (VOD), video games, and so on. Additionally, interaction with these varieties of content may be performed in a variety of ways. For example, the advent of on-demand programming, (e.g., recorded or cached on-demand and broadcast media content, IP-based television (IPTV) media content, and so on) provides a viewer with the option to navigate a recorded program or on-demand media with media content navigation features commonly referred to as "trick modes". These media content navigation features are typically initiated with a remote control device and include commands such as fast-forward, skip-ahead in the program, skip to a next segment, pause the program, and the like. The increased varieties of content and techniques that may be utilized to interact with the content, however, may overburden traditional systems which were utilized to provide the content, thereby limiting the provision of and interaction with the content.

SUMMARY

A manager/remote content architecture is described. The architecture may be configured to provide a variety of functionality. For example, the architecture may provide management of content received from a content provider, such as to determine which client devices are authorized to output the content. The architecture, for instance, may include a "manager" client device that allocates content usage by other "remote" client devices, as well as content usage by the manager client device itself. Additionally, the architecture may utilize techniques to provide for such allocation should the manager client device become unavailable. For instance, a technique may be employed which allows one of the remote client devices to act as a "limited manager" to allocate content usage by the architecture until such a time that the manager client device again becomes available, a new manager client device is available, and so on.

This Summary is provided to introduce a selection of concepts in a simplified form that are farther described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Users are continually exposed to ever increasing amounts and varieties of content. Additionally, the types of techniques which may be employed to interact with this content are also increasing. Accordingly, the amount, varieties and types of interactive techniques that may be employed in consumption of content by a user may result in the use of a significant amount of resources. However, the amount of resources that are available to the user in consuming the content may be limited due to a variety of factors. For example, a certain amount of resources (e.g., bandwidth) may be allocated to each premises (e.g., household) serviced by a content provider. The premise, however, may have an ability to consume more resources than are allocated to the premise, such as by having an amount of client devices that as a whole are able to consume more bandwidth than that which is available from the content provider for that premises.

A manager/remote content architecture is described which may be utilized to allocate content usage. For example, the architecture may provide management of content received from a content provider, such as to determine which client devices located at a premise (e.g., a household, office, and so on) are authorized to output content received from over a communication network. The architecture, for instance, may include a "manager" client device that allocates content usage by other "remote" client devices, as well as content usage by the manager client device itself. Therefore, limited resources (e.g., bandwidth) available to the premise may be managed for use in an environment that is able to consume more than the limited resources.

However, in some instances the manager client device may become unavailable, which could therefore limit the architecture as a whole from consuming content. Accordingly, the architecture may utilize techniques to provide for such allocation should the manager client device become unavailable. For instance, a technique may be employed which allows one of the remote client devices to act as a "limited manager" to allocate content usage by the architecture until such a time that the manager client device again becomes available, a new manager client device is available, and so on. Further discussion of content allocation and management may be found in relation to FIGS. 5-6.

In the following discussion, an exemplary environment is first described which is operable to employ the manager/remote content architecture. Exemplary procedures are then described which may be implemented by the exemplary environment, as well as in other environments.

Exemplary Environment

Figure 1:
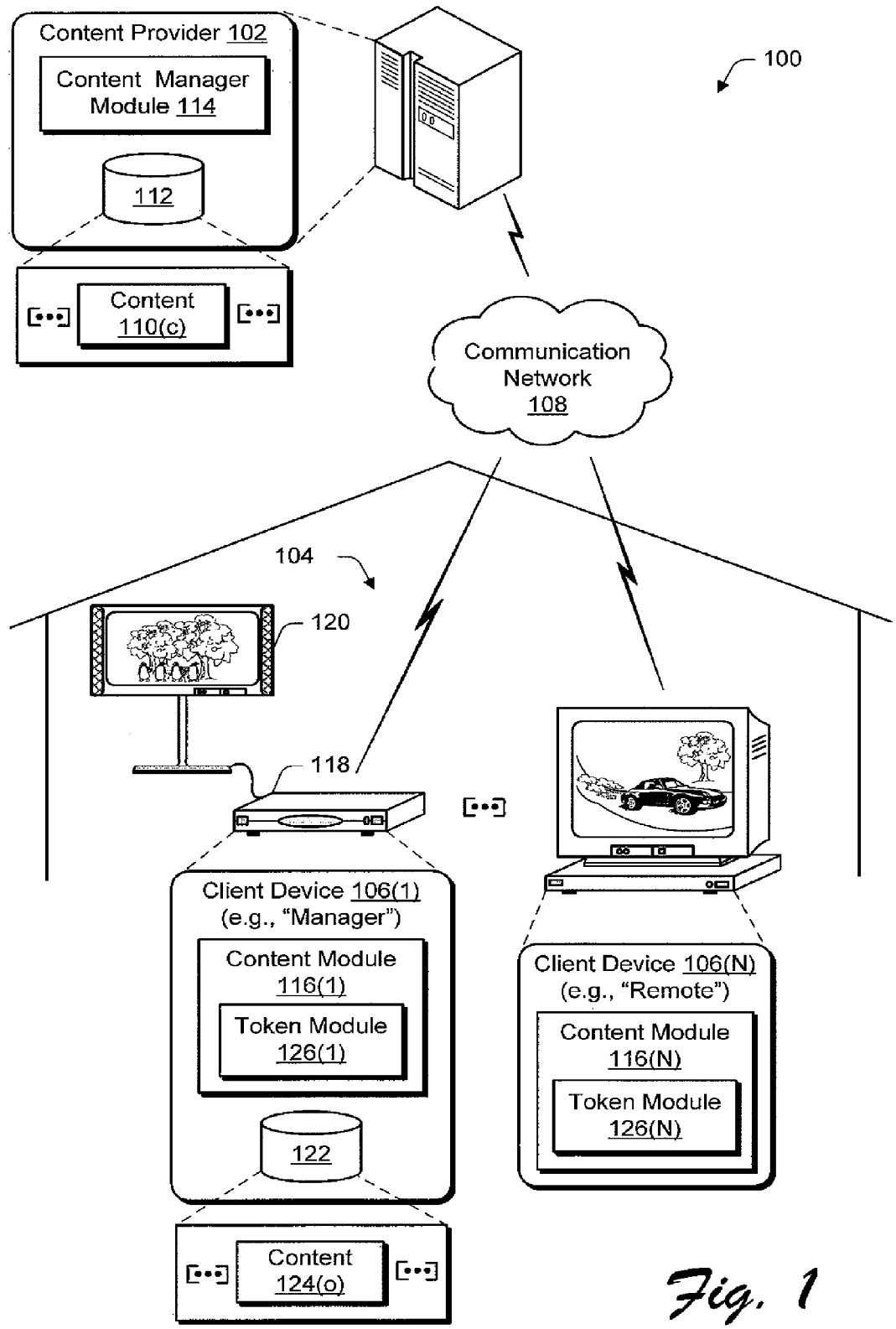
FIG. 1 is an illustration of an environment in an exemplary implementation that is operable to employ a manager/remote content architecture.

FIG. 1 illustrates an environment 100 in an exemplary implementation that is configured to employ a manager/remote content architecture. Although the environment 100 of FIG. 1 is illustrated as an IP-based television (IPTV) environment, the environment 100 may assume a wide variety of other configurations, such as a traditional television broadcast environment, a broadcast environment with back-channel communication capabilities, and so on.

The environment 100 includes a content provider 102 (which may be representative of multiple content providers) and a viewing system 104 that can include any number of client devices, which are illustrated as client devices 106(1)-106(N). The viewing system 104 is illustrated as a household viewing system that has several viewing areas (e.g., different rooms) for viewing content, such as television programming. Although the viewing system 104 is depicted as employed within a particular premises (e.g., the household), it should be apparent that the viewing system 104 may also be employed in multiple premises without departing from the spirit and scope thereof.

The viewing system 104 is configured for communication with the content provider 102 via a communication network 108 which, in this example, is an IP-based network. The content provider 102 is illustrated as including a variety of content 110(c) (where "c" can be any integer from one to "C") that is stored in storage 112, e.g., a computer-readable medium.

The content 110(c) may be configured for distribution over the communication network 108 (e.g., through execution of a content manager module 114) in a variety of ways. For example, the content 110(c) may include any form of television programs, commercials, music, movies, video on-demand (VOD), pay-per-view (PPV), movies and other media content, recorded media content, interactive games, network-based applications, and any other similar audio, video, and/or image content. In addition, content 110(c) in general may include music streamed from a computing device to one or more of the client devices 106(1)-106(N), such as a television-based set-top box, and may also include video-on-demand (VOD) media content delivered from a server, a photo slideshow, and any other audio, video, and/or image content received from any type of content source.

To control consumption of the content 110(c) received from over the communication network 108 (as well as content that is available locally), each of the client devices 106(1)-106(N) is illustrated as including a respective content module 116(1)-116(N). The content modules 116(1)-116(N) are executable to provide a wide variety of functionality related to content output. For example, the content modules 116(1)-116(N) may be executed to communicate with the content provider 102 (and more particularly the content manager module 114) to request particular content 110(c). For instance, the content module 116(1), when executed, may provide authentication and billing information to order VOD, PPV, and so on. In another example, the content modules 116(1)-116(N) are executable to decompress and decrypt content 110(c) received from the communication network 108 and provide other digital rights management functionality. A variety of other examples are also contemplated.

Client device 106(1), for instance, is illustrated as being implemented by a set-top box 118 that is communicatively coupled to a display device. 120, such as any type of television, monitor, or similar television-based display system that renders audio, video, and/or image data. Client 106(1) is also illustrated as including digital video recorder (DVR) functionality. For example, client device 106(1), through execution of the content module 116(1), may record content 110(c) received from the content provider 102 over the communication network 108 in storage 122 as content 124(o), where "o" can be any integer from one to "O". Therefore, client device 106(1) may output the content 124(o) from storage 122 at a later time as desired by a user of the client device 106(1). Further, the client device 106(1) (e.g., through execution of the content module 116(1)) may provide other DVR related functionality, such as "time shifting" an output of the content 124(o), e.g., by pausing playback of content 124(o) through use of a pause buffer.

The viewing system 104 may also utilize a variety of other techniques to record content. For example, the storage 122 may be implemented as an independent component of the viewing system 104 and connected to the manager client device 106(1). Alternatively, the storage 122 may be implemented as a component of the manager client device 106(1) as illustrated, which manages recordings initiated from any of the other remote client devices 106(2)-106(N). In yet another embodiment, the storage may be a distributed recording system where any one or more of the client devices 106(1)-106(N) include recording media that is centrally managed by the manager client device 106(1). For example, multiple client devices may include storage. In a further embodiment, each client device 106(1)-106(N) may manage its own local storage. In still yet another embodiment, the storage 122 may be implemented by the content provider 102 (e.g., when configured as a head end) and managed by the manager client device 106(1) as a "network digital video recorder" (NDVR). In other words, the storage 122 may also be provided as a "drive in the sky" that is responsive to one or more of the client devices 106(1)-106(N).

Although a few examples of client devices 106(1)-106(N) have been described, the client devices 106(1)-106(N) may also be configured in a wide variety of other ways, such as wireless phones, game consoles, "media centers", and so on. For example, client device 106(N) is illustrated in FIG. 1 as a set-top box that does not include DVR functionality, unlike client device 106(1) of FIG. 1. Thus, the client devices 106(1)-106(N) may be implemented in a variety of different ways to provide different amounts of functionality (e.g., "thin" or "thick" devices) with any number and combination of differing components, an example of which is further described with reference to the exemplary client device 106(n) shown in FIG. 3. Likewise, the environment 100 may be implemented with any number and combination of differing components, an example of which is described below with reference to the exemplary entertainment and information system 400 shown in FIG. 4.

Content 110(c) may be allocated to the client devices 106(1)-106(N) by the content provider 102 in a variety of ways. For example, each of the premises (e.g., the illustrated household) may be allocated a certain amount of bandwidth by the content provider 102. The premises may then use one or more techniques to determine which clients 106(1)106(N) receive portions of the allocated bandwidth. In other words, the viewing system 104 (itself) may allocate which portion of the bandwidth allocated to viewing system 104 is provided to particular client devices 106(1)-106(N).

In the exemplary viewing system 104, for instance, client device 106(1) is depicted as a "manager" client device that is responsible for allocating the streams, thereby managing distribution of the data streams to one or more of the other "remote" client devices, such as client device 106(N). Thus, the "manager" client device 106(1) manages content 110(c) consumption within the viewing system 104, which may be performed using a variety of techniques.

Each of the client devices 106(1)-106(N), for instance, may include a respective token module 126(1)-126(N) that is responsible for maintaining tokens that determine which of the client devices 106(1)-106(N) are authorized to receive content 110(c) from the content provider 102. The "remote" client device 106(N), for example, may connect to the manager client device 106(1) to receive a data stream for live television, delayed program viewing, and/or recorded DVR playback. In another example, the remote client device 106(N) may receive the content 110(c) directly from the communication network 108 (e.g., without "going through" the manager client device 106(1)) but is authorized to do so when the client 106(N) has a token that is approved by the manager client device 106(1). A variety of other examples are also contemplated. Thus, the manager client device 106(1) may arbitrate which client devices 106(1)-106(N), including the manager client device 106(1) itself, are authorized to receive and/or output the content 110(c).

In some instances, however, the manager client device 106(1) may not be available to perform management of the content 110(c). In such an instance, techniques may be employed such that one of the other client devices (e.g., client devices 106(2)-106(N)) acts to manage content consumption, further discussion of which may be found in relation to FIGS. 5-6.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, farther description of which may be found in relation to FIG. 2. The features of the content consumption and management techniques described below are platform-independent, meaning that the techniques may be implemented on a variety of commercial computing platforms having a variety of processors.

Figure 2:
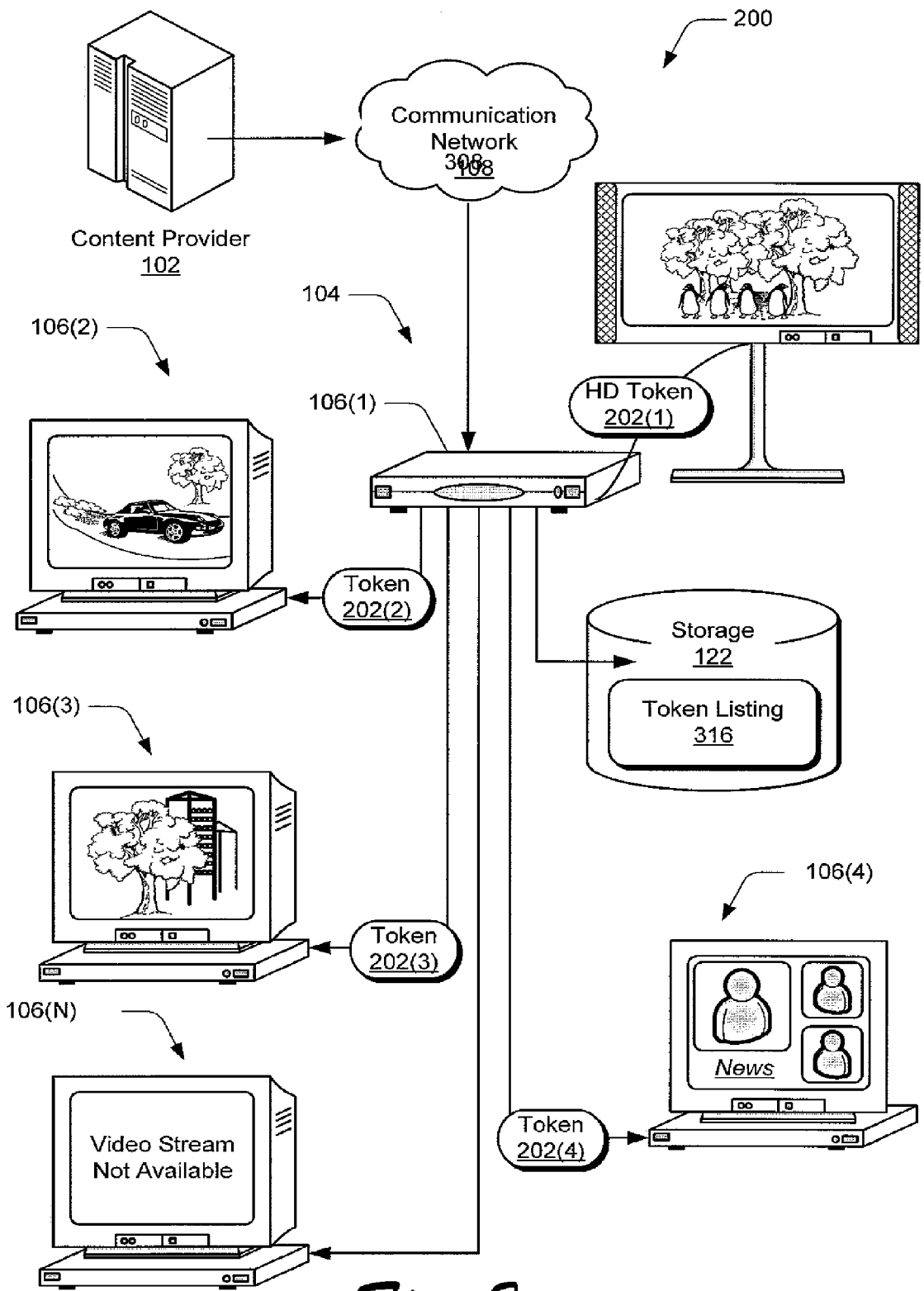
FIG. 2 is an illustration of an exemplary implementation of a system showing allocation of content from a content provider by a viewing system of FIG. 1 in greater detail.

FIG. 2 illustrates an exemplary implementation of a system 200 showing allocation of content from the content provider 102 by the viewing system 104 of FIG. 1 in greater detail. The illustrated viewing system 104 includes a plurality of client devices 106(1), 106(2), 106(3), 106(4) and 106(N). In this system, the master client device 106(1) arbitrates control of four (4) data streams from the content provider 102 via the communication network 108. For example, the data streams may be obtained by the remote clients 106(2)-106(N) through the manager client device 106(1). In another example, the data streams are managed by the manager client device 106(1), but the remote client devices 106(2)-106(N) receive the streams directly from the communication network 108. A variety of other examples are also contemplated.

Although the data streams are not shown specifically, the illustrated communication links illustrate various communication links which are configured to communicate the data streams. Additionally, the communication links are not intended to be interpreted as a one-way communication link, but rather may also represent two-way communication. A viewing selection from a first data stream is shown for viewing on display device at the manager client device 106(1). A second data stream is illustrated as directed from the master client device 106(1) to the remote client device 106(2). Similarly, a third data stream is directed from the master client device 106(1) to the remote client device 106(3) and a viewing selection from the third data stream is shown for viewing on a respective display device. Likewise, a fourth data stream is directed from the master client device 106(1) to the remote client device 106(4) and a viewing selection from the fourth data stream is shown for viewing on a respective display device.

The available bandwidth for the viewing system 104, however, may not be able to accommodate as many data streams as there are client devices. As illustrated in FIG. 2, for instance, it is not unusual for a household to have five (5) or more televisions in various rooms and at various locations throughout the household. In this instance, the number of client devices exceeds the number of data streams allocated to the viewing system 104 from the content provider 102. For example, the viewing system 104 is depicted as including at least a fifth client device 106(N) of the viewing system 104. The corresponding display device of the client device 106(N) indicates that a video stream is not available, because the data streams allocated to the viewing system 104 (e.g., the four data streams) have already been directed to the other client devices 106(1)-106(4).

In the illustrated system 200 of FIG. 2, a technique is shown which utilizes tokens 202(1)-202(4) to arbitrate control of which of the client devices 106(1)-106(N) of the viewing system 104 are authorized to receive content 110(c) of FIG. 1 from the content provider 102. For example, each of the remote client devices 106(2)-106(N) may communicate with the manager client device 106(1) to receive a respective token 202(1)-202(4) that enables the respective remote client device 106(2)-106(N) to output the content 110(c). The manager client device 106(1), for instance, may maintain a token listing 204 in storage 122 which lists which tokens 202(1)-202(4) have been provided to which respective client devices 106(1)-106(4). In the illustrated example, because client device 106(N) does not include one of the tokens 202(1)-202(N), the client device 106(N) is not authorized to output content 110(c) from the content provider 102. A variety of techniques may be utilized to determine which clients receive tokens at a particular time, such as a priority listing, random number comparison (e.g., each client generates a random number with the "higher" or "lower" number indicating who "wins" and is thus authorized to output content 110(c)), and so on.

The data streams allocated by the content provider 102 to the viewing system 104 may be configured in a variety of ways, such as a combination of high definition and/or standard definition data streams. For example, the viewing system 104 may receive one (1) high definition (HD) data stream and three (3) standard definition (SD) data streams depending upon available bandwidth to deliver the data streams. As more bandwidth becomes available, the viewing system 104 may receive more high definition and/or standard definition data streams. Accordingly, the tokens 202(1)-202(4) may be configured to allocate these particular types of data streams. For example, token 202(1) is illustrated as an "HD token" and therefore a client device having that token 202(1) (e.g., the manager client device 106(1) in the illustration of FIG. 2) is authorized to receive and/or output the HD data stream. Because the other client devices 106(2)-106(4) do not have the HD token, however, these devices are restricted in this instance to receive and/or output a standard definition data stream. A variety of other examples are also contemplated, such as through use of tokens to distribute VOD content, picture-in-picture streams, and so forth.

Thus, in the system 200 of FIG. 2, the manager client device 106(1) is responsible for controlling which clients are authorized to output data streams from the content provider 102. In some instances, however, the particular client device (e.g., the manager client device 106(1)) may not be available to perform this function, such as due to a network, hardware and/or software errors; user errors (e.g., accidentally disconnecting a device); power failures; and so on. Accordingly, techniques may be employed in order to authorize another one of the client devices (e.g., client devices 106(2)-106(N)) to act as the manager. For example, one of the remote client devices (e.g., clients 106(2)-106(N)) may assume the role of a "limited manager" that manages allocation of the data streams until the manager (e.g., client device 106(1)) is available. In another example, when the remote client device has manager functionality, it may assume the role of a "full" manager. Thus, the viewing system 104 is still able to arbitrate usage of the data streams in the event of unavailability (e.g., failure) of one or more of the client devices 106(1)-106,) further discussion of which may be found in relation to FIGS. 5-6.

The manager, and consequently the limited manager, may also be configured to provide additional functionality to the viewing system 104. For example, the manager client device 106(1) may be configured to control content recordation performed by the viewing system 104, whether the recordation occurs locally at the manager, distributed across the viewing system 104, remotely as a network digital video recorder (NDVR), and so on. In another example, the manager client device 106(1) may act as a "playback service" such that the remote client devices 106(2)-106(N) may request content from the manager client device 106(1), e.g., to stream content 124(o) from storage. In a further example, the manager client device 106(1) may manage consumption of content for recording purposes also, e.g., to show a notification to the remote devices that, if not answered, causes the respective token to be removed for use by the manager client device 106(1) to record content. A variety of other examples are also contemplated.

Figure 3:
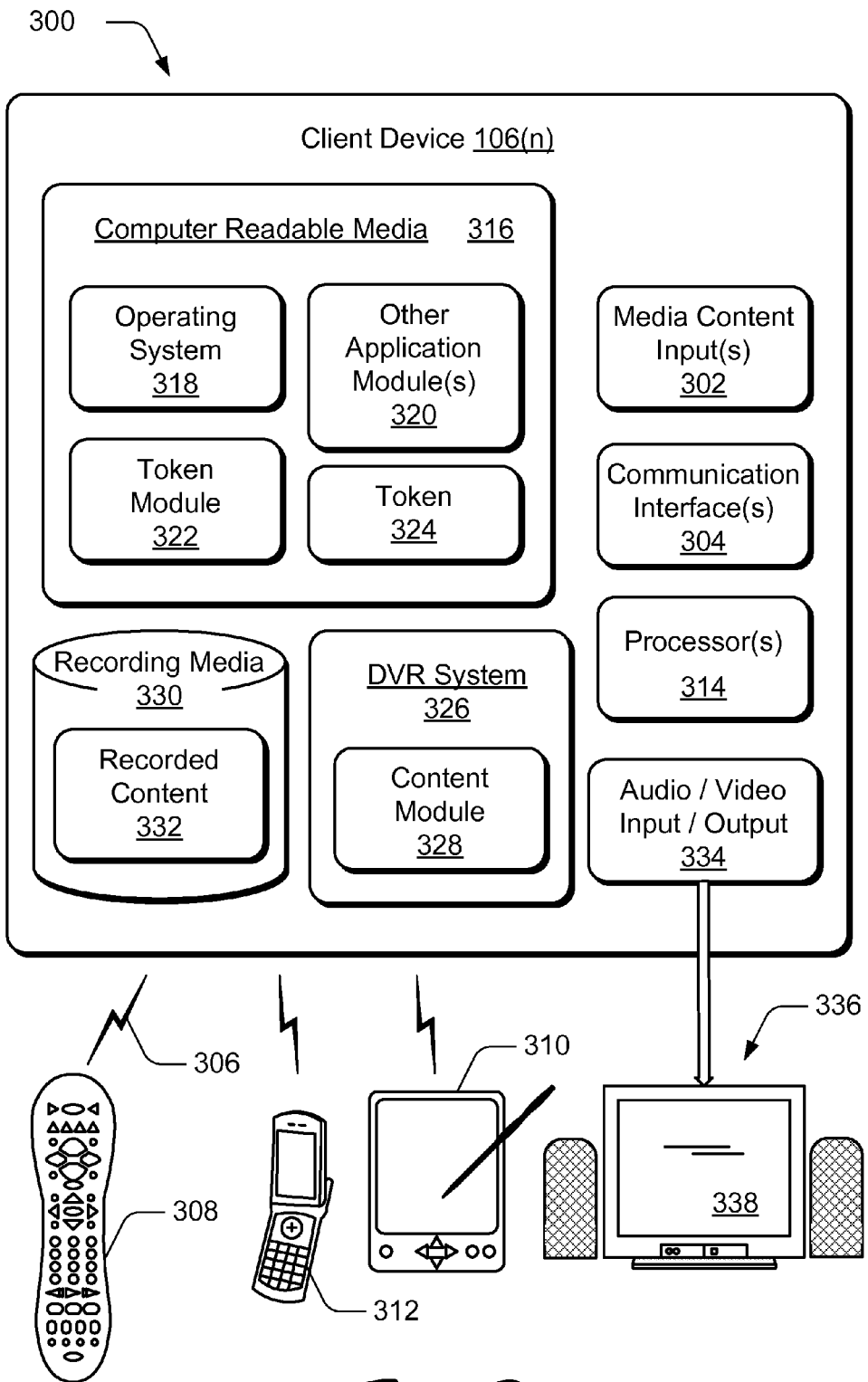
FIG. 3 illustrates an exemplary implementation of a client device of FIGS. 1 and 2 in greater detail.

FIG. 3 illustrates an exemplary implementation 300 of a client device 106(n) (which may or may not correspond to one or more of the client devices 106(1)-106(N) of FIG. 2) in greater detail. The client device 106(n) may be implemented as any form of a computing, electronic, and/or television-based client device.

Client device 106(n), as illustrated in FIG. 3, includes one or more media content inputs 302 which may include Internet Protocol (IP) inputs over which streams of media content are received via an IP-based network. Client device 106(n) further includes communication interface(s) 304 which can be implemented as any one or more of a serial and/or parallel interface, a wireless interface, any type of network interface, a modem, and as any other type of communication interface. A wireless interface enables client device 106(n) to receive control input commands 306 and other information from an input device, such as from remote control device 308, PDA (personal digital assistant) 310, cellular phone 312, or from another infrared (IR), 802.11, Bluetooth, or similar radio frequency (RF) input device.

A network interface provides a connection between the client device 106(n) and a communication network by which other electronic and computing devices can communicate data with device 106(n). Similarly, a serial and/or parallel interface provides for data communication directly between client device 106(n) and the other electronic or computing devices. A modem facilitates client device 106(n) communication with other electronic and computing devices via a conventional telephone line, a digital subscriber line (DSL) connection, cable, and/or other type of connection.

Client device 106(n) also includes one or more processors 314 (e.g., any of microprocessors, controllers, and the like) which process various computer executable instructions to control the operation of client device 106(n), such as to communicate with other electronic and computing devices. Client device 106(n) can be implemented with computer-readable media 316, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. It should be apparent that although a single computer-readable media 316 is illustrated, the computer readable media 316 may be representative of multiple types and combinations of computer-readable media.

Computer-readable media 316 provides data storage mechanisms to store various information and/or data such as software applications and any other types of information and data related to operational aspects of client device 106(n). For example, an operating system 318 and/or other application modules 320 can be maintained as software applications with the computer-readable media 316 and executed on the processor(s) 314.

For example, one or more of the other application modules 320 can be implemented as a program guide application that processes program guide data and generates program guides for display. The program guides enable a viewer to navigate through an onscreen display and locate broadcast programs, recorded programs, video-on-demand (VOD), movies, interactive game selections, network-based applications, and other media access information or content of interest to the viewer. Likewise, the computer-readable media 316 may also store the token module 322 and/or tokens 324 that are used to allocate bandwidth in the viewing system 104 as previously described in relation to FIGS. 1 and 2. The client device 106(n) may also include a DVR system 326 with the content module 328 (which may or may not correspond to the content modules 116(1)-116(N) of FIG. 1) and recording media 330 (which may or may not correspond to the storage 122 of FIG. 1) to maintain recorded content 332.

The client device 106(n), as illustrated, also includes an audio and/or video input/output 334. The audio/video input/output 334 may be utilized for a variety of purposes, such as to provide audio and video to an audio rendering and/or display system 336 and/or to other devices that process, display, and/or otherwise render audio, video, and image data. Video signals and audio signals, for instance, may be communicated from client device 106(n) to a television 338 (or to other types of display devices) via an RF (radio frequency) link, S-video link, composite video link, component video link, analog audio connection, or one or more other such communication links.

Figure 4:
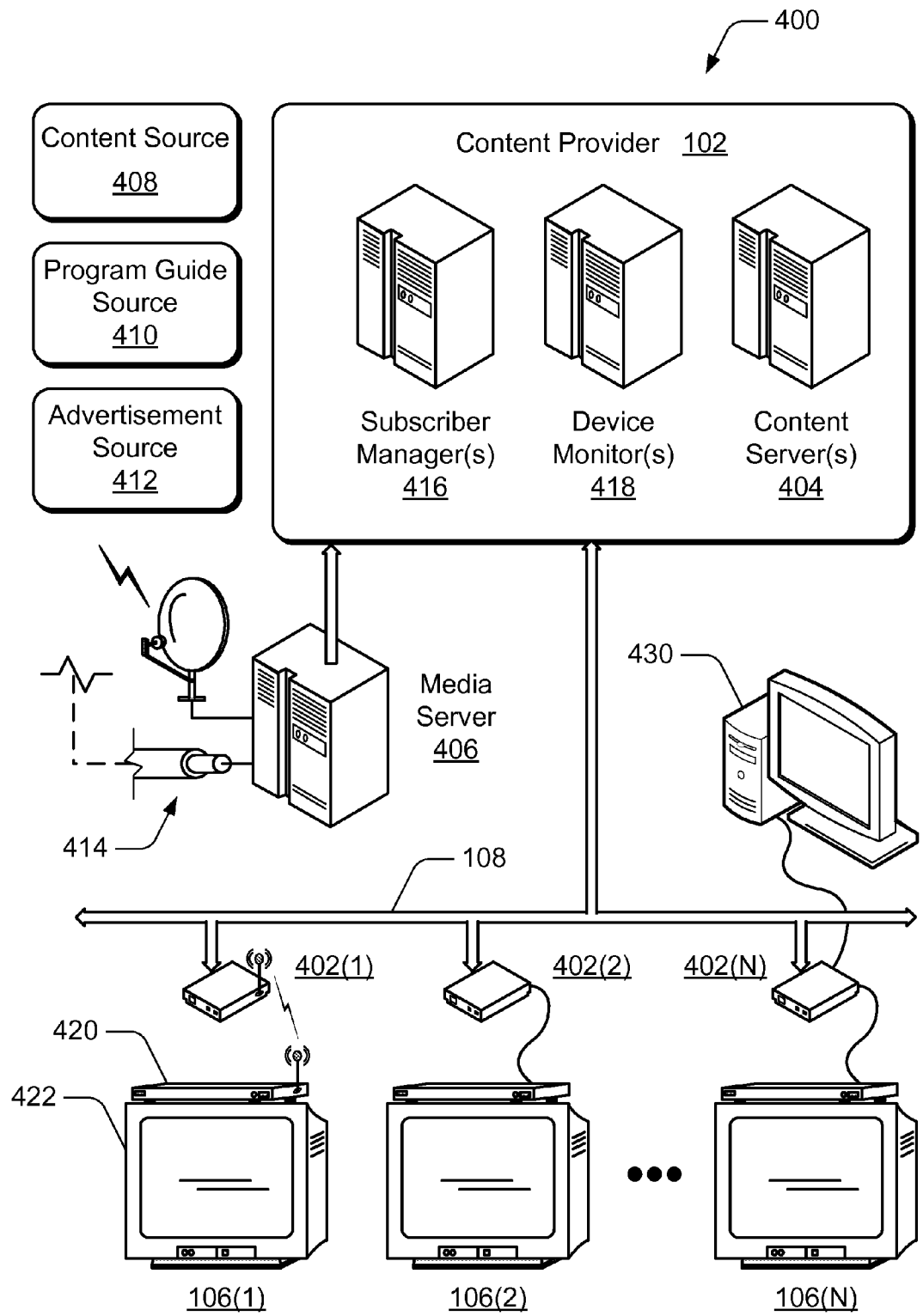
FIG. 4 illustrates a system in an exemplary implementation in which a content provider of FIGS. 1 and 2 is shown in greater detail.

FIG. 4 illustrates a system 400 in an exemplary implementation in which the content provider 102 is shown in greater detail. System 400 facilitates the distribution of program content, program guide data, and advertising content to multiple viewers and to multiple viewing systems. System 400 includes the content provider 102 and the plurality of client devices 106(1)-106(N), each being configured for communication via an IP-based network 108. Each of the client devices 106(1)-106(N), for instance, may receive one or more data streams from the content provider 102 and then arbitrate stream allocation to distribute the data streams (e.g., one to each) to one or more other remote client devices in the viewing system 104.

The communication network 108 may be implemented in a wide variety of ways, such as a wide area network (e.g., the Internet), an intranet, a Digital Subscriber Line (DSL) network infrastructure, a point-to-point coupling infrastructure, and so on. Additionally, the communication network 108 can be implemented using any type of network topology and any network communication protocol, and can be represented or otherwise implemented as a combination of two or more networks. A digital network can include various hardwired and/or wireless links 402(1)-402(N), routers, gateways, and so on to facilitate communication between content provider 102 and the client devices 106(1)-106(N). The client devices 106(1)-106(N) receive content (e.g., television programs, program guide data, advertising content, closed captions data, and the like) from content server(s) 404 of the content provider 402 via the communication network 108.

System 400 may also include a variety of servers to provide functionality, such as to obtain and provide specific types of content. For example, the illustrated system 400 includes a media server 406 that receives program content from a content source 408, program guide data from a program guide source 410, and advertising content from an advertisement source 412. In an embodiment, the media server 406 represents an acquisition server that receives the audio and video program content from content source 408, an EPG server that receives the program guide data from program guide source 410, and/or an advertising management server that receives the advertising content from the advertisement source 412.

The content source 408, the program guide source 410, and the advertisement source 412 control distribution of the program content, the program guide data, and the advertising content to the media server 406 and/or to other servers. The program content, program guide data, and advertising content is distributed via various transmission media 414, such as satellite transmission, radio frequency transmission, cable transmission, and/or via any number of other wired or wireless transmission media. In this example, media server 406 is shown as an independent component of system 400 that communicates the program content, program guide data, and advertising content to content provider 102. In an alternate implementation, media server 406 can be implemented as a component of content provider 102.

Content provider 102 in the system 400 of FIG. 4 is representative of a headend service in a television-based content distribution system, for example, that provides the program content, program guide data, and advertising content to multiple subscribers, e.g., the client devices 106(1)-106(N). The content provider 102 may be implemented in a variety of ways, such as a satellite operator, a network television operator, a cable operator, and the like to control distribution of program and advertising content, such as movies, television programs, commercials, music, and other audio, video, and/or image content to the client devices 106(1)-106(N).

Content provider 102 includes various components to facilitate content processing and distribution, such as a subscriber manager 416, a device monitor 418, and the content server 404. The subscriber manager 416 manages subscriber data, and the device monitor 418 monitors the client devices 106(1)-106(N) (e.g., and the subscribers), and maintains monitored client state information.

Although the various managers, servers, and monitors of content provider 102 (to include the media server 406 in an embodiment) are illustrated and described as distributed, independent components of content provider 102, any one or more of the managers, servers, and monitors can be implemented together as a multi-functional component of content provider 102.

The client devices 106(1)-106(N), as previously described, may be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client device 106(N) is implemented via a computing device. Additionally, any of the client devices 106(1)-106(N) can implement features and embodiments of manager/remote content architecture as described herein.

Exemplary Procedures

The following discussion describes manager/remote content arbitration techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 and 400 of respective FIGS. 2, 3 and 4.

Figure 5:
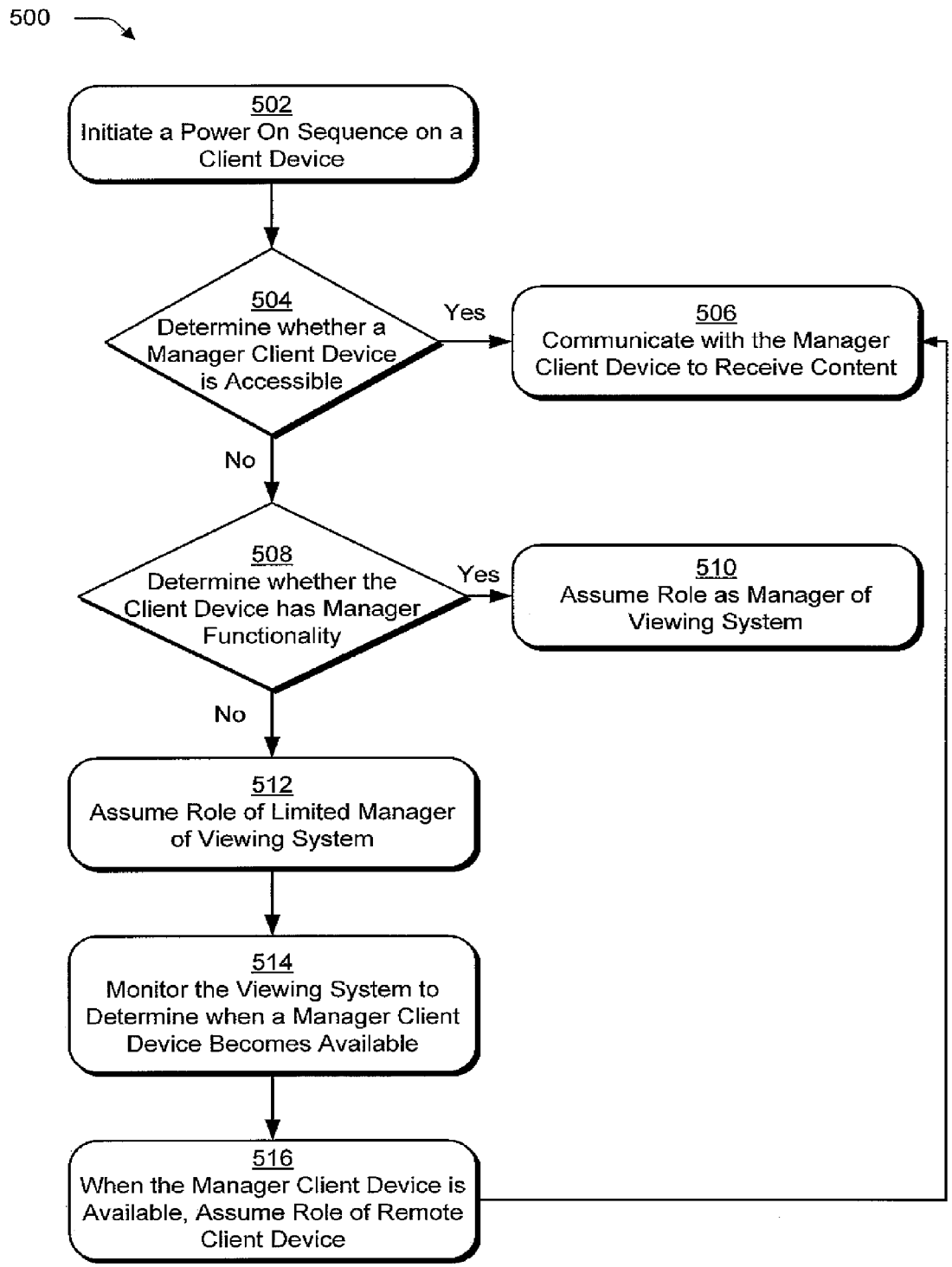
FIG. 5 is a flow diagram depicting a procedure in an exemplary implementation in which a discovery process to manage content in a viewing system is shown.

FIG. 5 depicts a procedure 500 in an exemplary implementation in which a discovery process to manage content in a viewing system is shown. A power on sequence on a client device is initiated (block 502), e.g., by "booting up" the client device 106(2) of FIG. 2. A determination is then made as to whether a manager client device is accessible (decision block 504). For example, the client device 106(2) may "listen" for notifications broadcast by a manager client device in a viewing system 104.

When a manager client device is accessible ("yes" from decision block 504), the client device communicates with the manger client device to receive content (block 506). The client device 106(2), for instance, may communicate with the manager client device 106(1) to receive a data stream provided by the manager client device 106(1), receive a token which enables the client device 106(2) to receive content directly from the content provider 102 over the communication network 108, and so on.

When a manager client device is not accessible ("no" from decision block 504), a determination is made as to whether the client device has manager functionality (block 508). For instance, the client device 106(2) may have access to storage (e.g., a hard disk drive that is local to the client) that may be used to record content in the viewing system 104. Therefore, the client device 106(2) may record content and provide the recorded content to other client devices in the viewing system. Additionally, the client device 106(2) may be configured to arbitrate data streams provided by the content provider 102 for use by the other client devices, such as through execution of a respective token module. Therefore, when the client device has manager functionality ("yes" from decision block 508) the client device 106(2) may assume a role as a manger of the viewing system (block 510).

When the client device does not have manager functionality ("no" from decision block 508), the client device assume a role of a limited manager of the viewing system (block 512). Continuing with the previous example, the client device 106(2) may not have access to storage and/or functionality that may be utilized to record content in the viewing system 104. However, the client device 106(2) may include functionality to arbitrate content usage in the viewing system 104, such as through use of a token module to provide tokens as previously described. Thus, in this instance the client device 106(2) is a "limited" manager, in that, it does not include all of the functionality of a "full" manager, e.g., to record content in this instance. It should be noted, however, that the "limited" master still enables the viewing system 104 (and more particularly client devices within the viewing system 104) to consume content even when the "full" manager is not available. Although recordation or non-recordation of content has been described as a difference between "limited" manager and "full" manager functionality, a variety of other functionality may be illustrative of the difference between the devices without departing from the spirit and scope thereof.

Because the limited manager does not include all the functionality of the "full" manager, the client device may monitor the viewing system to determine when a manager client device becomes available (block 514). For example, the limited manager client device may "ping" other client devices that are a part of the viewing system 104 to arbitrate content consumption as previously described. In another example, the limited manager client device may be "pinged" itself (i.e., receive messages from other client devices) which indicate that the client device is available and the functional capabilities of the respective client devices. When a client device becomes available on the viewing system 104 that is capable of providing "full" manager functions, the client device assumes a role of "remote" client device (block 516) to enable that functionality to be provided to the viewing system 104. Continuing again with the previous example, the client device 106(1) having DVR functionality may become available, and therefore that client device 106(1) may become the manager of the viewing system (e.g., arbitrate content usage) with the client device 106(2) communicating with the manager client device to receive content (block 506). A variety of other examples are also contemplated.

Figure 6:
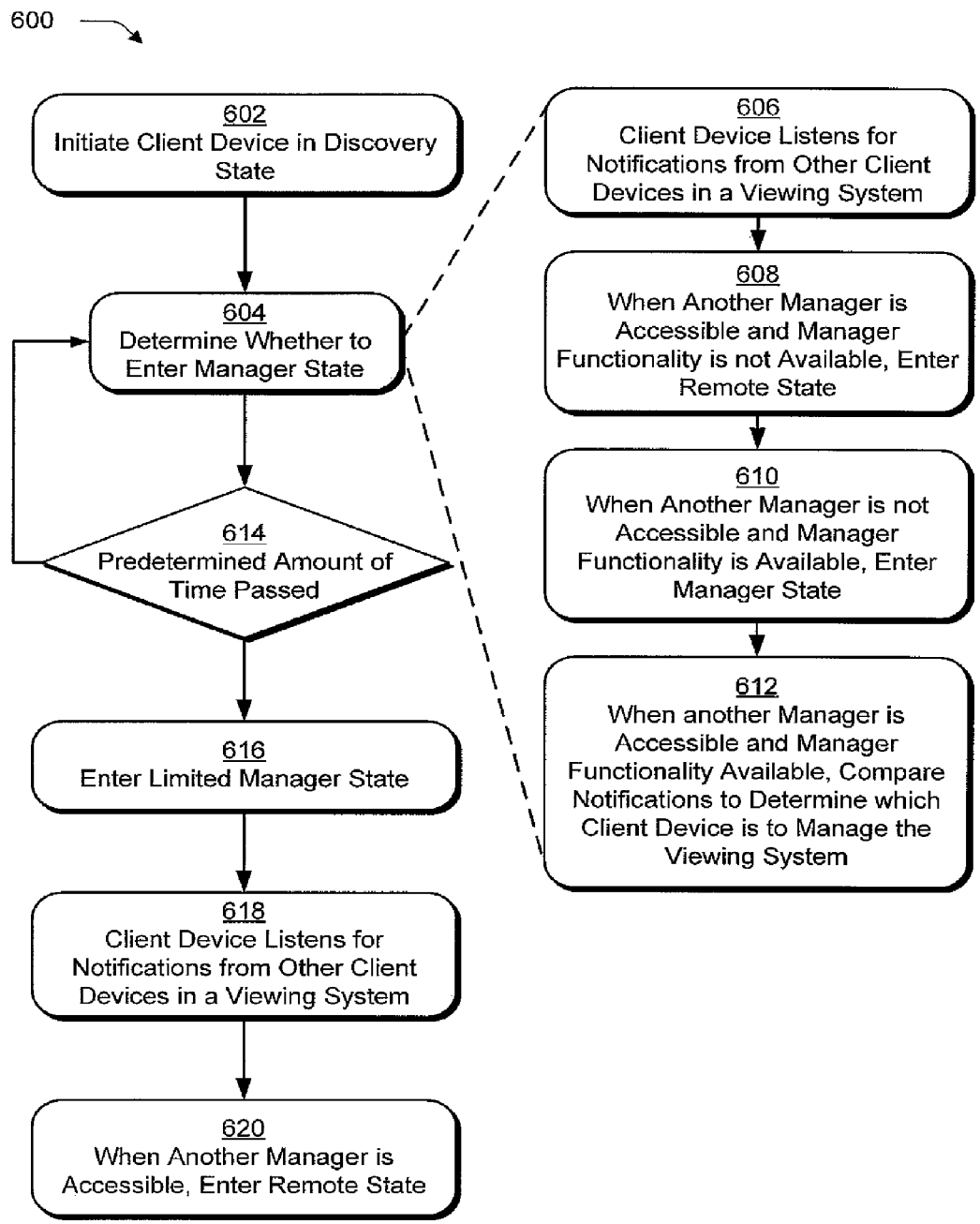
FIG. 6 is a flow diagram depicting a procedure in an exemplary implementation in which a plurality of client devices arbitrate, one with another, to determine which device is to manage a viewing system.

FIG. 6 depicts a procedure 600 in an exemplar implementation in which a plurality of client devices arbitrate, one with another, to determine which device is to manage a viewing system. When there are two or more client devices 106(1)-106(N) within a viewing system 104, the client devices 106(1)-106(N) may arbitrate to determine which of the client devices is the "manager" of the viewing system.

For example, client devices may be in one of four states: "discovery"; "manager"; "limited manager"; and "remote". When a client device is initiated it is placed in the discovery state (block 602), during which, the client device listens for messages from other client devices in a viewing system (block 604). During the discovery state, the client determines whether to enter the "manager" state (block 604). This determination may be performed in a variety of ways.

The client device, for example, may "listen" for notifications from other client devices in a viewing system (block 606). When another manager is accessible and manager functionality is not available on the client device, the client device enters the remote state (block 608). For instance, one of the notifications may identify another client device 106(1) as being the "manager" of the viewing system 104. If the client device 106(2) that is listening to the notifications does not have manager functionality, then the other client device 106(1) provides the most functionality to the viewing system 104 and therefore remains the manager.

When another manager is not accessible and manager functionality is available, the client device enters the manager state (block 610). For instance, the client device 106(1) may initially join the viewing system 104 which may or may not have other "remote" or "limited manager" client devices. Therefore, because the client device may add additional functionality of being a "full" manager to the viewing system, that client device enters the manager state. Accordingly, the client device may then allocate consumption in the viewing system 104 as well as provide the additional functionality, such as DVR functionality.

When another manager is accessible and manager functionality is available at the client device, notifications are compared to determine which client device is to manage the viewing system (block 612). For example, two or more manager client devices may appear in the viewing system 104 due to timing issues. Therefore, when a client device that has manager functionality is initiated, it generates a random number which is included in a notification (e.g., announcement) that is broadcast to the other client devices, if any, in the viewing system. When a manager is notified that another manager is included in the viewing system 104, it compares its own sequence number with that in the notification. The manager which satisfies a predetermined condition (e.g., the sequence number is higher or lower than the other sequence number) is then deemed to be the manager of the viewing system 104. In this way, conflicts between managers may be quickly resolved. A variety of other techniques are also contemplated, such as through comparison of functionality of the respective client devices to determine "who wins" and "who backs down".

A determination may be made as to whether a predetermined amount of time has passed (decision block 614) while the other determinations regarding the manager state are made (e.g. blocks 608-612). When the predetermined amount of time has passed ("yes" from decision block 614), the client device enters the limited manager state (block 616) to arbitrate content consumption on the viewing system 104 as previously described. When another manager is accessible, the client device enters the remote state (block 620) in order to avail itself of the added functionality of the manager client device.

These techniques may also be leveraged should the manager client device become unavailable during operation (e.g., the manager client device was already acknowledged as the manager of the viewing system). For example, if the manager client device 106(1) becomes unavailable (e.g., due to a hardware, software and/or network error), other client devices may assume the role of "manager" or "limited manager" as described above. In order to detect this unavailability, the manager may "ping" the other client devices with notifications at predetermined intervals. When one or more such intervals have passed (e.g., two), the other clients devices may determine which device is to be the "manager" or "limited manager". A variety of other techniques are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A viewing system having a plurality of client devices to output content streamed from a content provider over a communication network comprising:
 a first client device in the viewing system to determine whether a second client device in the viewing system is accessible as a manager client device to provide a set of manager functions to manage consumption of the content by the first client device;
 when the second client device is not accessible, the first client device to assume a role of a limited manager client device for the viewing system until a third client device that is different from the first client device and the second client device and that is capable of performing the set of manager functions is determined to be available, the first client device to provide a subset of manager functions to manage consumption of the content by the plurality of client devices, wherein the limited manager client device utilizes tokens among the plurality of client devices to arbitrate bandwidth allocated by the content provider for the viewing system by allocating a portion of the bandwidth for an authorized client device to output the content, in which the viewing system includes different manager functionality at different times based at least in part on the first and second client devices such that the viewing system does not include functionality of storing the content when managed by the first client device but does include the functionality of storing the content when managed by the second client device, wherein the consumption of the content by the plurality of client devices is managed with the tokens based at least in part upon receiving requests for content from one or more client devices of the plurality of client devices.

2. The system as described in claim 1, when the second client device becomes available:

the first client device assuming a remote role, wherein the remote role comprises receiving enablement from the manager client device to output the content; and the second client device assuming a manager role to manage consumption of the content by the plurality of client devices.

3. The system as described in claim 2, wherein when the first client device assumes the remote role, the first client device communicates with the second client device to be allocated at least a portion of the content, wherein the content comprises audio/video content.

4. The system as described in claim 2, wherein when the first client device assumes the remote role and the second client device assumes the manager role, the content is received by the first client device through the second client device.

5. The system as described in claim 1, wherein:

a SD token specifies standard definition (SD) content that is consumed by one of the requesting client devices that is allocated the SD token, wherein the SD token is allocated to the one of the requesting client devices and the SD token is maintained by a token module in a computer readable media of the one of the requesting client devices; and a HD token specifies high definition (HD) content that is consumed by a same or a different one of the requesting client devices that is allocated the HD token, wherein the HD token is allocated to the same or the different one of the requesting client devices and the HD token is maintained by the token module in a computer readable media of the same or the different one of the requesting client devices.

6. The system as described in claim 1, wherein the functionality of storing the content is performed through use of a storage that is local on the second client device.

7. The system as described in claim 1, wherein an available bandwidth of the content allocated by the content provider to the viewing system is less than a bandwidth consumed by the plurality of client devices in the viewing system.

8. A method implemented on a client device by a processor configured to execute instructions that, when executed by the processor, direct the client device to perform acts comprising:

determining that a manager client device to provide a set of manager functions for a viewing system is not accessible;

assuming a role of limited manager of the viewing system with a plurality of client devices to provide a subset of manager functions in response to determining that the manger client device is not accessible, wherein:

one or more client devices in the viewing system consumes data streamed over a communication network from a content provider; and the client device allocates a consumption of data streams allocated by the content provider to a subset of the plurality of client devices in response to receiving requests for the data streams from the subset of client devices, wherein the content provider allocates and manages the consumption of the data streams for the viewing system and the client device utilizing tokens associated with the plurality of client devices to arbitrate the data streams by allocating a data stream for an authorized client device to output the data stream, the content provider allocating and managing the consumption of the data streams in response to the receiving of the requests for the data streams from the subset of client devices;

monitoring availability of the one or more client devices to determine when the manager client device becomes available to allocate the consumption of the data streams to the plurality of client devices and to record at least a portion of the data streams; and monitoring the availability of the one or more client devices to determine whether the one or more client devices are capable of performing the set of manager functions based at least in part on whether the one or more client devices have satisfied one or more predetermined conditions.

9. A method as described in claim 8, wherein when the manager client device becomes available, responsibility for data stream allocation in the viewing system is transferred from the client device having the role of limited manager to the manager client device.

10. A method as described in claim 9, wherein responsibility is transferred by:

assuming a remote role by the client device having the role of limited manager; and assuming a manager role by the manager client device.

11. A method as described in claim 10, wherein when the client device assumes the remote role and the manager client device assumes the manager role, the client device in the remote role communicates with the manager client device in the manager role for allocation of at least a portion of the data streams.

12. A method as described in claim 8, wherein:

a SD token specifies a standard definition (SD) data stream that is consumed by one of the subset of client devices that is allocated the SD token, wherein the SD token is allocated to the one of the subset of client devices and the SD token maintained by a token module in a computer readable media of the one of the subset of client devices; and a HD token specifies a high definition (HD) data stream that is consumed by a same or a different one of the subset of client devices that is allocated the HD token, wherein the HD token is maintained by the token module in a computer readable media of the same or the different one of the subset of client devices.

13. A method as described in claim 8, wherein the recordation of at least a portion of the data streams by the manager client device is performed locally on the manager client device.

14. One or more memory devices comprising computer executable instruction that, when executed, direct a client device to perform acts comprising:
- determining whether a manager client device is accessible in a viewing system comprising a plurality of client devices;
- in response to determining that the manager client device is not accessible, determining whether the client device has a manager functionality, wherein the manager functionality comprises a functionality to record an audio/video content and to provide recorded audio/video content to other client devices in the viewing system;
- in response to determining that the client device does not have the manager functionality:
- assuming a limited manager functionality, wherein the limited manager functionality comprises a functionality to allocate use of bandwidth for carrying the audio/video content to the plurality of client devices in the viewing system, in which the viewing system does not have the functionality to record the audio/video content when managed by the limited manager client device but does include the functionality to record the audio/video content when managed by the manager client device; and
- identifying a different client device of the plurality of client devices that is determined to have the manager functionality and that can perform the functionality until the manager client device is determined to be available;
- managing consumption of the audio/video content by providing tokens to a subset of the plurality of client devices in the viewing system in response to receiving requests from that subset of the client devices, wherein the tokens include a high definition (HD) token that authorizes one of the requesting client devices to receive a data stream of HD audio/video content and a standard definition (SD) token that authorizes one of the requesting client devices to receive a data stream of SD audio/video content;
- maintaining a token listing which lists which of the tokens have been provided to which respective client devices in the viewing system; and
- arbitrating use of bandwidth allocated by a headend service to the viewing system by the providing of the tokens, wherein the client device utilizes the tokens among the plurality of client devices to allocate the HD audio/video content and the SD audio/video content associated with one or more portions of the bandwidth allocated by the headend service for respective authorized client devices and the plurality of client devices in the viewing system as a whole consume more bandwidth then the headend service in a television-based content distribution system allocates to the viewing system.

15. The one or more memory devices as described in claim 14, wherein the acts further comprise:
- monitoring the viewing system to determine when the manager client device becomes available, wherein the monitoring comprises exchanging messages with the other client devices in the viewing system, the messages indicating availability and functional capabilities of a client device sending the message;
- when the manager client device becomes available, assuming a role of remote client device, wherein the role of remote client device comprises receiving tokens from the manager client device.

16. The one or more memory devices as described in claim 14, wherein the functionality to record is performed through use of a storage that is local on the manager client device.

17. The method as described in claim 8, wherein the data stream recordation functionality is performed through use of a storage that is local on the manager client device.

18. The method as described in claim 8, wherein an available bandwidth allocated by the content provider to the viewing system is less than a bandwidth consumed by the plurality of client devices in the viewing system.

* * * * *